Patented Apr. 28, 1931

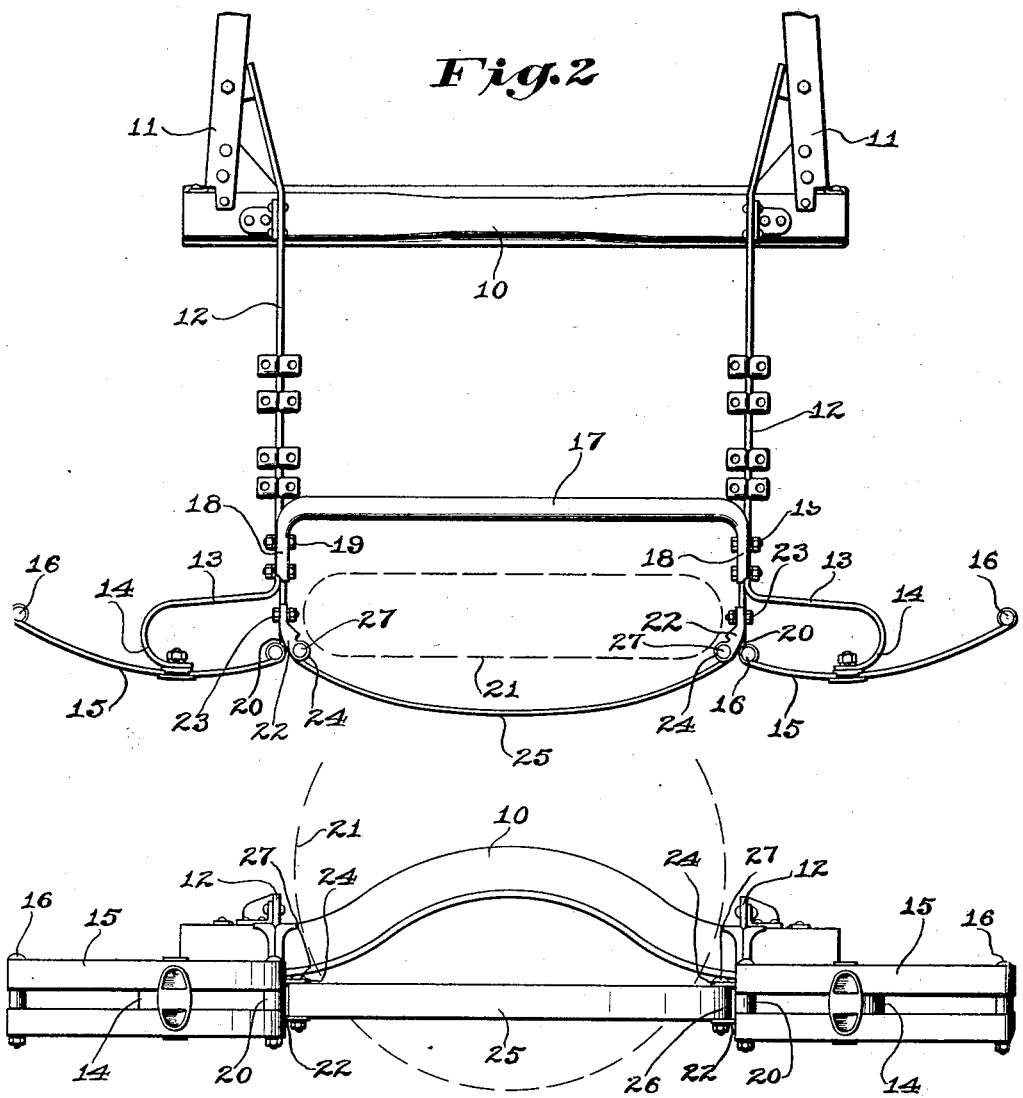

1,802,925

UNITED STATES PATENT OFFICE

NIELS H. F. OLSEN, OF DETROIT, MICHIGAN, ASSIGNOR TO FORD MOTOR COMPANY, OF DEARBORN, MICHIGAN, A CORPORATION OF DELAWARE

BUMPER

Application filed July 10, 1930. Serial No. 467,046.

The object of my invention is to provide a bumper of simple, durable and inexpensive construction.

A further object of my invention is to provide an auxiliary bumper bar especially adapted for use with the rear bumperettes ordinarily installed on the rear of an automobile. Automobiles are usually equipped with a cross bar type bumper extending entirely across the front of the automobile and a pair of rear bumperettes which protect only the rear fenders. The spare tire of such an automobile is usually carried in a suitable tire well formed in one of the front fenders so that adequate protection for the rear of the car is offered by the two rear bumperettes only. However, some persons desire to carry two spare tires in which case the second spare tire is usually mounted at the rear of the car between the bumperettes.

Formerly, when the spare tire was mounted between the bumperettes, the owner was put to the expense of purchasing a new cross bar bumper assembly to be installed in place of the bumperettes. With my improved construction the bumperettes are still used for protecting the rear fenders so that no equipment is scrapped and further, I have provided an auxiliary bumper bar which extends between the two bumperettes to offer the additional protection necessary for the second spare tire.

I thereby obtain protection equivalent to that obtained with a full cross bar bumper without the added expense of such bumper. It is not contended that the two bumperettes together with my co-operating bar is cheaper to manufacture than a front cross bar bumper, but it is contended that in the ordinary case where the owner of the car has purchased his car equipped with bumperettes and has later found it desirable to carry a second spare wheel, that the addition of my auxiliary bumper bar to the existing bumperettes costs only a fraction of what a complete new cross bumper assembly would cost.

With these and other objects in view, my invention consists in the arrangement, construction, and combination of the various parts of my improved device, as described in my specifications, claimed in my claims, and illustrated in the accompanying drawings, in which:

Figure 1 shows a rear view of my improved bumper assembly, and

Figure 2 shows a top view of the bumper shown in Figure 1.

Referring to the accompanying drawings, I have used the reference numeral 10 to indicate generally the rear cross member of an automobile frame having a pair of longitudinal side members 11 extending forwardly therefrom. The side members 11 do not extend rearwardly from the rear cross member 10 so that special bumper brackets must be provided to secure the bumperettes to the frame. The applicant's bumper brackets consist of a pair of relatively light strips of steel 12, the rear end of each of which is bent outwardly at approximately right angles at 13. The extreme outer end of this bent portion is bowed back upon itself at 14 to form a support for the bumperettes. Each rear bumperette consists of a pair of spaced parallel bars 15 secured together at their outer ends by vertical bolts 16 while the inner ends of the bars 15 are also secured in spaced relationship by a similar bolt. The inner ends of the bumperette bars 15 are supported by brackets 20, the rear ends of which co-act with the center portion of the inner bolts 16 while the forward ends of these brackets are bolted to the strips 12 just forwardly of the bent portion 13.

I have provided a bumperette bracket spacing member 17 extending between the outer straight portions of the strips 12, which member is provided with a pair of outwardly extending feet 18 each of which is fastened to one of the strips 12 by bolts 19. The function of the member 17 and the feet 18 at the end thereof is to prevent distortion of the bumperettes due to impact loads being applied thereon.

The above described structure comprises the ordinary bumperette installation. If it is desired to carry a spare tire between the bumperettes, as illustrated by dotted lines 21, some protection must be given to the lower portion of this tire, as the bumperettes do not now provide this protection.

Of course, the bumperette bars 15 may be removed and a pair of continuous cross bars substituted therefor but this entails considerable expense and it is to reduce the cost of such change that my device is designed.

I provide a pair of brackets 22 adapted to be secured to the brackets 20 by bolts 23, each of these brackets 22 having a pair of ears 24 which form pivots for securing an auxiliary bumper bar 25 between the bumperettes. The auxiliary bar 25 is bowed outwardly and its ends are provided with eyes 26 which are secured between the ears 24 by a pair of bolts 27. Thus, impact loads applied to the bar 25 tend to spread the bumperettes which spreading is resisted by the spacing member 17.

Among the many advantages arising from the use of my improved device, it may be well to mention that I have provided an auxiliary bumper bar which may be conveniently installed with very little labor after the car is in service. Further, the cost of my improved structure is very small and, as none of the existing parts ordinarily provided on the car need be thrown away it is finding great favor among automobile users.

Some changes may be made in the arrangement, construction and combination of the various parts of my improved device without departing from the spirit of my invention, and it is my intention to cover by my claims such changes as may reasonably be included within the scope thereof.

I claim as my invention:

1. In an automobile bumper construction, a pair of supports extending rearwardly from said automobile, a pair of bumperettes mounted on said supports so as to protect the rear fenders of said automobile, an outwardly bowed auxiliary bumper bar extending between said supports, and a bracing member extending between said supports so that the spreading of the supports from an impact on the auxiliary bumper bar will be resisted by the bracing member.

2. In an automobile bumper construction, a pair of supports extending rearwardly from said automobile, a pair of bumperettes mounted on the outer ends of said supports so as to protect the rear fenders of said automobile, a pair of brackets having ears extending inwardly therefrom adapted to be secured to said supports, and an auxiliary bumper bar having its ends pivotally secured between said ears to protect the rear center portion of said automobile.

NIELS H. F. OLSEN.